US005517902A

United States Patent [19]
Boston

[11] Patent Number: 5,517,902
[45] Date of Patent: May 21, 1996

[54] INDOOR/OUTDOOR GRILL AND FRY COOKER

[76] Inventor: Larry J. Boston, 306 Winesett Cir., Plymouth, N.C. 27962

[21] Appl. No.: 529,836

[22] Filed: Sep. 18, 1995

[51] Int. Cl.$^6$ ............................ A47J 37/00; A47J 37/04
[52] U.S. Cl. ........................ 99/340; 99/446; 99/450; 99/482; 126/25 R; 126/9 R
[58] Field of Search .................. 99/339, 340, 399, 99/400, 401, 402, 419–421, 425, 444–446, 447–450, 481, 482; 126/25 R, 9 R

[56] References Cited

U.S. PATENT DOCUMENTS

| | | | |
|---|---|---|---|
| 3,581,654 | 6/1971 | Tescula | 99/400 |
| 3,938,431 | 2/1976 | Potvin | 99/425 |
| 4,020,322 | 4/1977 | Muse | 99/450 |
| 4,037,580 | 7/1977 | Angelo | 126/25 R |
| 4,094,295 | 6/1978 | Boswell et al. | 126/9 R |
| 4,430,559 | 2/1984 | Rabay | 126/25 R |
| 4,495,860 | 1/1985 | Hitch et al. | 99/340 |
| 4,512,249 | 4/1985 | Mentzel | 99/482 |
| 4,554,864 | 11/1985 | Smith et al. | 99/340 |
| 4,976,252 | 12/1990 | Cianciola | 99/401 |
| 5,156,083 | 10/1992 | Leighton | 99/419 |
| 5,359,923 | 11/1994 | Boswell | 99/340 |

Primary Examiner—Timothy F. Simone

[57] ABSTRACT

An indoor/outdoor grill and fry cooker comprising a main body portion with a generally cylindrical side wall, a generally hemispherically-shaped bottom with legs extending downwardly therefrom, an open top and a hollow lower chamber therewithin; an upper cover positionable over the open top of the main body portion with an upper region and a lower region and an upper chamber therewithin, a handle formed in the lower region of the cover, and a mouth plate extending downwardly from the lower region into the main body portion; a coal pot positionable within the chamber of the main body portion, the coal pot having a generally cylindrical side wall, a pair of supports secured to the top of the side wall; and a plurality of operational components positioned between the main body portion and cover during operation and use including a circular heat/smoke cover plate with rollers therebeneath positioned on the supports, a circular screen-type filter thereabove, an imperforate circular grease trap thereabove, and a circular bottom grate in a grid-like configuration thereabove.

4 Claims, 2 Drawing Sheets

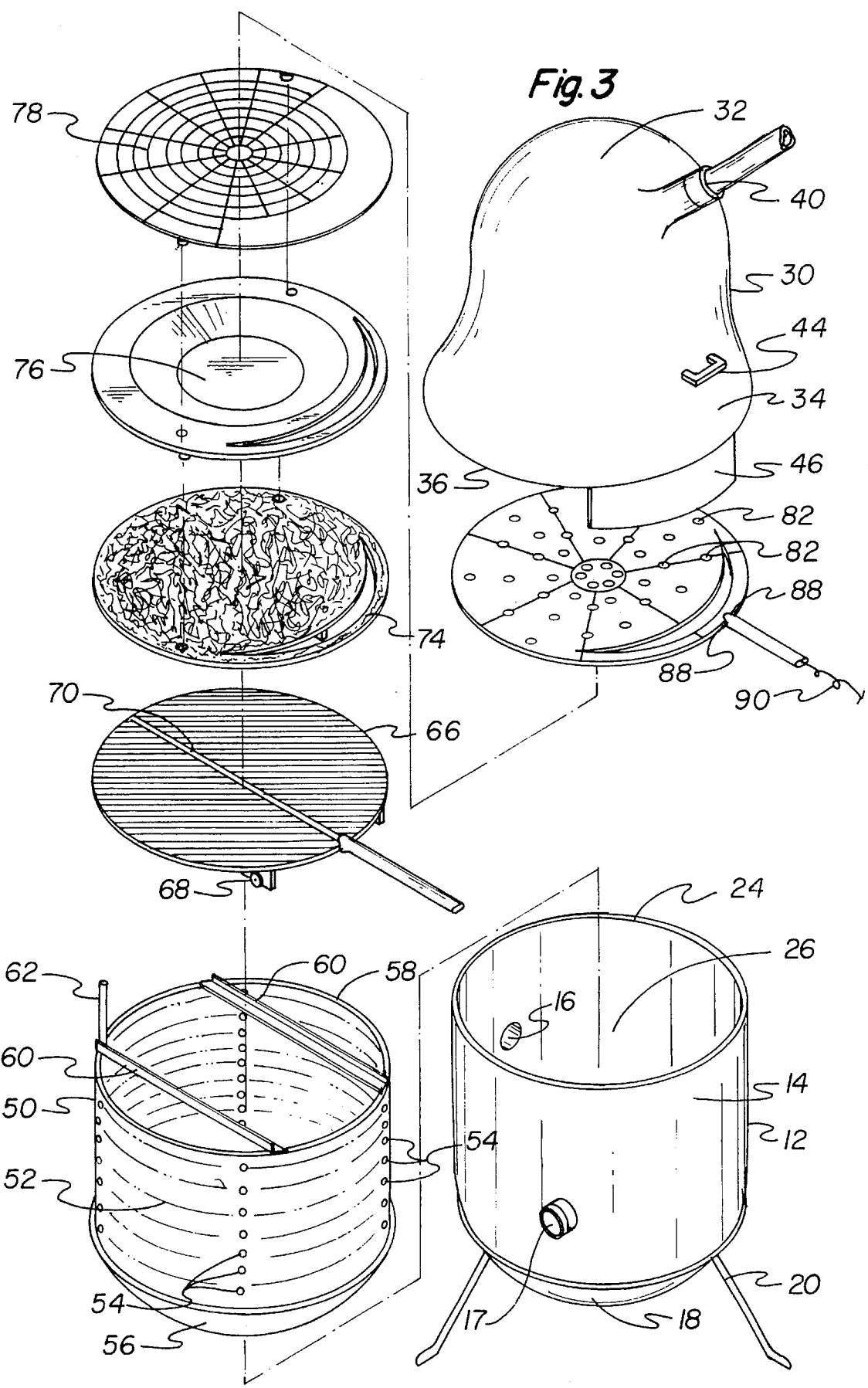

5,517,902

INDOOR/OUTDOOR GRILL AND FRY COOKER

BACKGROUND OF THE INVENTION

1. Field of the Invention

The present invention relates to a indoor/outdoor grill and fry cooker and, more particularly, pertains to grilling and frying, indoors or outdoors, with a superior and universal cooking unit.

2. Description of the Prior Art

The use of grills and fryers and other cookers of various designs and configurations is known in the prior art. More specifically, grills and fryers and other cookers of various designs and configurations heretofore devised and utilized for the purpose of grilling and frying and otherwise cooking by various methods and apparatuses are known to consist basically of familiar, expected, and obvious structural configurations, notwithstanding the myriad of designs encompassed by the crowded prior art which has been developed for the fulfillment of countless objectives and requirements.

By way of example, the prior art discloses Tescula in U.S. Pat. No. 3,581,654.

Potvin U.S. Pat. No. 3,938,431.

Rabay U.S. Pat. No. 4,430,559.

Cianciola U.S. Pat. No. 4,976,252.

Lastly, Leighton U.S. Pat. No. 5,156,083.

In this respect, the indoor/outdoor grill and fry cooker according to the present invention substantially departs from the conventional concepts and designs of the prior art, and in so doing provides an apparatus primarily developed for the purpose of grilling and frying, indoors or outdoors, with a superior and universal cooking unit.

Therefore, it can be appreciated that there exists a continuing need for a new and improved indoor/outdoor grill and fry cooker which can be used for grilling and frying, indoors or outdoors, with a superior and universal cooking unit. In this regard, the present invention substantially fulfills this need.

SUMMARY OF THE INVENTION

In view of the foregoing disadvantages inherent in the known types of grills and fryers and other cookers of various designs and configurations now present in the prior art, the present invention provides an improved indoor/outdoor grill and fry cooker. As such, the general purpose of the present invention, which will be described subsequently in greater detail, is to provide a new and improved indoor/outdoor grill and fry cooker and method which has all the advantages of the prior art and none of the disadvantages.

To attain this, the present invention essentially comprises a new and improved indoor/outdoor grille and fry cooker comprising, in combination, a main body portion in a cylindrical configuration with a generally cylindrical side wall having an air input aperture and an exhaust aperture, a generally hemispherically-shaped bottom with legs extending downwardly therefrom, an open top and a hollow lower chamber therewithin; an upper generally bell-shaped cover positionable over the open top of the main body portion with an upper hemispherically-shaped upper region and a flared lower region and an upper chamber therewithin, an exhaust opening and an air input opening formed in the upper region of the cover and a handle formed in the lower region of the cover, and a mouth plate extending downwardly from the lower region into the main body portion when the cover is positioned on the main body portion during operation and use; a coal pot positionable within the chamber of the main body portion, the coal pot having a generally cylindrical side pall with a plurality of apertures in vertical line formed therein and with a generally hemispherically-shaped bottom and open top, a pair of supports secured to the top and an upwardly extending post positionable in the upper chamber of the cover during operation and use; a plurality of operational components positioned between the main body portion and cover during operation and use, the operational components including a circular heat/smoke cover plate with rollers therebeneath positioned on the supports and a hinged diameter for opening and closing each half of the cover plate, a circular screen-type filter thereabove, an imperforate circular grease trap thereabove, a circular bottom grate in a grid-like configuration thereabove, and a circular top cover with apertures therethrough and a curved slot adjacent to the periphery for the passage of the mouth plate thereabove; and electrical heating components within the top cover and electrical lines extending therefrom for coupling to a source of electrical potential during operation and use.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved indoor/outdoor grill and fry cooker which has all the advantages of the prior art grills and fryers and other cookers of various designs and configurations and none of the disadvantages.

It is another object of the present invention to provide a new and improved indoor/outdoor grill and fry cooker which may be easily and efficiently manufactured and marketed.

It is a further object of the present invention to provide a new and improved indoor/outdoor grill and fry cooker which is of a durable and reliable construction.

An even further object of the present invention is to provide a new and improved indoor/outdoor grill and fry cooker which is susceptible of a low cost of manufacture with regard to both materials and labor, and which accordingly is then susceptible of low prices of sale to the consuming public, thereby making such grills and fryers and other cookers of various designs and configurations economically available to the buying public.

Still yet another object of the present invention is to provide a new and improved indoor/outdoor grill and fry cooker which provides in the apparatuses and methods of the prior art some of the advantages thereof, while simultaneously overcoming some of the disadvantages normally associated therewith.

Even still another object of the present invention is to grill and fry, indoors or outdoors, with a superior and universal cooking unit.

Lastly, it is an object of the present invention to provide a indoor/outdoor grill and fry cooker comprising a main body portion with a generally cylindrical side wall, a generally hemispherically-shaped bottom with legs extending downwardly therefrom, an open top and a hollow lower chamber therewithin; an upper cover positionable over the open top of the main body portion with an upper region and a lower region and an upper chamber therewithin, a handle formed in the lower region of the cover, and a mouth plate extending downwardly from the lower region into the main body portion; a coal pot positionable within the chamber of the main body portion, the coal pot having a generally cylindrical side wall, a pair of supports secured to the top of the side wall; and a plurality of operational components positioned between the main body portion and cover during operation and use including a circular heat/smoke cover plate with rollers therebeneath positioned on the supports, a circular screen-type filter thereabove, an imperforate circular grease trap thereabove, and a circular bottom grate in a grid-like configuration thereabove.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded perspective view of the apparatus shown in FIG. 1.

The same reference numerals refer to the same parts throughout the various Figures.

DESCRIPTION OF THE PREFERRED EMBODIMENT

Figure 1:
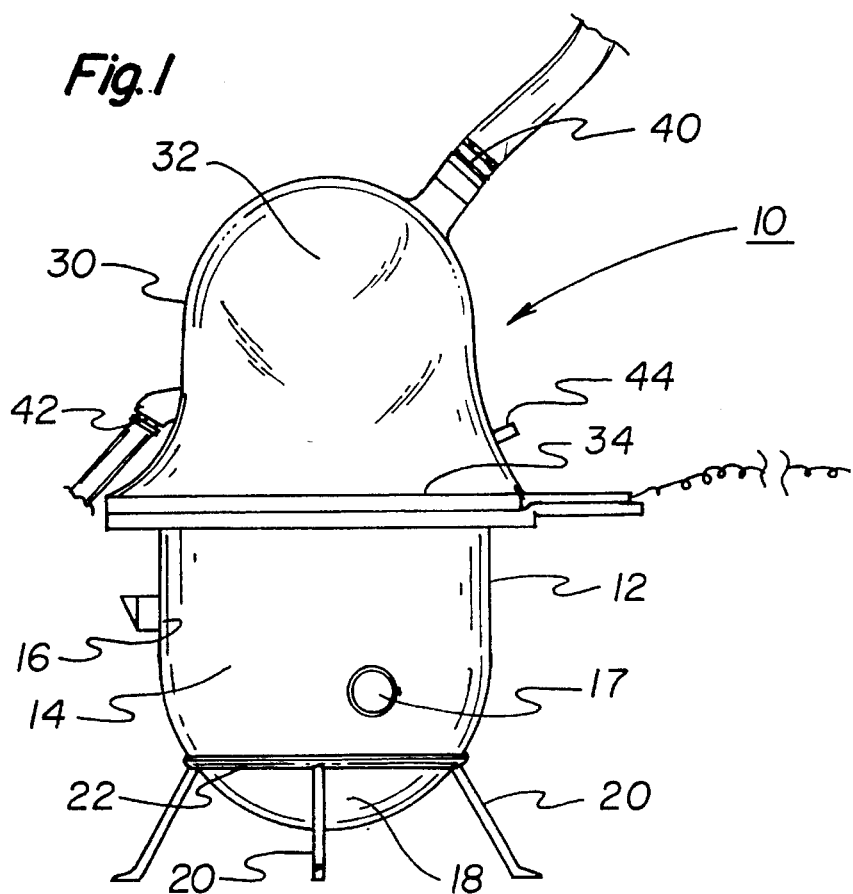
FIG. 1 is a perspective illustration of the preferred embodiment of the indoor/outdoor grill and fry cooker constructed in accordance with the principles of the present invention.
Figure 2:
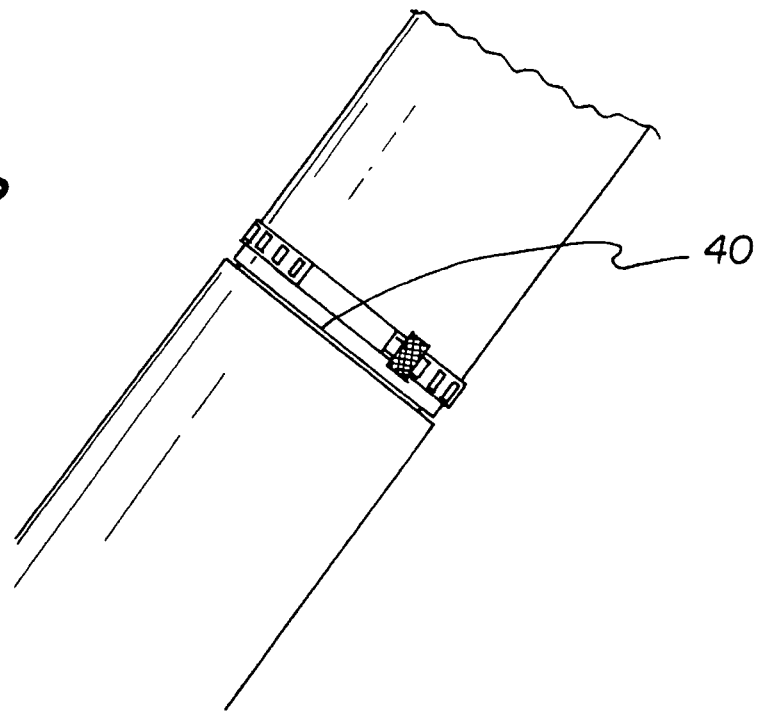
FIG. 2 is an enlarged side elevational view of the hose-to-cover coupling shown in FIG. 1.

With reference now to the drawings, and in particular to FIG. 1 thereof, the preferred embodiment of the new and improved indoor/outdoor grill and fry cooker embodying the principles and concepts of the present invention and generally designated by the reference numeral 10 will be described.

The present invention, the new and improved indoor/outdoor grill and fry cooker, is a system 10 comprised of a plurality of components. In their broadest context, the components include a main body portion, a cover, a coal pot, operational components and electrical components. Each of the individual components is specifically configured and correlated one with respect to the other so as to attain the desired objectives.

More specifically, the system 10 of the present invention includes as a central component a main body portion 12. Such portion is in a cylindrical configuration with a generally cylindrical side wall 14. Such side wall has an air input aperture 16 and associated hose or line. It also has an associated exhaust aperture. A generally hemispherically-shaped bottom 18 is also provided. In addition, legs 20 extend downwardly therefrom with a circular support 22 coupled to the upper ends of the legs. The side wall includes an open top 24 forming a hollow lower chamber 26 therewithin.

Operable with the main body portion is an upper generally bell-shaped cover 30. Such cover is positionable over the open top of the main body portion. Such cover includes an upper hemispherically-shaped upper region 32 and a flared lower region 34 with an upper chamber 36 therewithin. The cover is preferably fabricated of a heat resistant and transparent plastic.

The cover 30 also includes an exhaust opening 40 with an associated line. It also includes an air input opening 42 formed in the upper region of the cover. A handle 44 is formed in the lower region of the cover. In addition, a mouth plate 46 extends downwardly from the lower region of the cover into the main body portion when the cover is positioned on the main body portion during operation and use.

Positionable within the chamber of the main body portion is a coal pot 50. The coal pot has a generally cylindrical side wall 52 with a plurality of apertures 54 formed therein in vertical lines. A generally hemispherically-shaped bottom 56 and open top 58 span the side wall. A pair of supports 60 of L-shaped angle iron are secured to the top while an upwardly extending post 62 is positionable in the upper chamber of the cover during operation and use.

A plurality of separate operational components are positioned between the main body portion and cover during operation and use. The operational components include a circular heat/smoke cover plate 66 with rollers 68 therebeneath are positioned on the supports. In addition, a hinge 70 is centrally located at the diameter for opening and closing each half of the cover plate at the user's discretion.

Next above the cover plate is a circular screen-type filter 74. Next above the filter is an imperforate circular grease trap 76. A circular bottom grate 78 is next located above the grease trap and is formed in a grid-like configuration. Lastly provided is a circular top grate 80 located above the bottom grate. The top grate is formed with apertures 82 therethrough and also includes a curved slot 84 adjacent to the periphery. Such slot is for the passage of the mouth plate thereabove.

Lastly provided are electrical heating components 88. Such components ale located within the top cover. In addition, electrical lines 90 extend from the heating components for coupling to a conventional source of electrical potential during operation and use.

The present invention is an inside or outside grill cooker with an electric top plate or non-electric top plate. A bottom plate which is detachable is designed to catch the grease from the top plate. It dispels grease into a grease reservoir. It also has a screen filter to reduce the rise of ashes. A coal cover plate is provided to block smoke. A heat source is provided when the cooker is to be opened and divert it through a smoke passage vent. The device may grill and fry and also broil and steam.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved indoor/outdoor grille and fry cooker comprising, in combination:

a main body portion in a cylindrical configuration with a generally cylindrical side wall having an air input aperture and an exhaust aperture, a generally hemispherically-shaped bottom with legs extending downwardly therefrom, an open top and a hollow lower chamber therewithin;

an upper generally bell-shaped cover positionable over the open top of the main body portion with an upper hemispherically-shaped upper region and a flared lower region and an upper chamber therewithin, an exhaust opening and an air input opening formed in the upper region of the cover and a handle formed in the lower region of the cover, and a mouth plate extending downwardly from the lower region into the main body portion when the cover is positioned on the main body portion during operation and use;

a coal pot positionable within the chamber of the main body portion, the coal pot having a generally cylindrical side pall with a plurality of apertures in vertical line formed therein and with a generally hemispherically-shaped bottom and open top, a pair of supports secured to the top and an upwardly extending post positionable in the upper chamber of the cover during operation and use;

a plurality of operational components positioned between the main body portion and cover during operation and use, the operational components including a circular heat/smoke cover plate with rollers therebeneath positioned on the supports and a hinged diameter for opening and closing each half of the cover plate, a circular screen-type filter thereabove, an imperforate circular grease trap thereabove, a circular bottom grate in a grid-like configuration thereabove, and a circular top cover with apertures therethrough and a curved slot adjacent to the periphery for the passage of the mouth plate thereabove; and electrical heating components within the top cover and electrical lines extending therefrom for coupling to a source of electrical potential during operation and use.

2. A indoor/outdoor grill and fry cooker comprising:

a main body portion with a generally cylindrical side wall, a generally hemispherically-shaped bottom with legs extending downwardly therefrom, an open top and a hollow lower chamber therewithin;

an upper cover positionable over the open top of the main body portion with an upper region and a lower region and an upper chamber therewithin, a handle formed in the lower region of the cover, and a mouth plate extending downwardly from the lower region into the main body portion;

a coal pot positionable within the chamber of the main body portion, the coal pot having a generally cylindrical side wall, a pair of supports secured to the top of the side wall; and a plurality of operational components positioned between the main body portion and cover during operation and use including a circular heat/smoke cover plate with rollers therebeneath positioned on the supports, a circular screen-type filter thereabove, an imperforate circular grease trap thereabove, and a circular bottom grate in a grid-like configuration thereabove.

3. The device as set forth in claim 2 and further including:

a circular top grate with apertures therethrough and a curved mouth hole for the passage therethrough of the mouth plate.

4. The device as set forth in claim 3 and further including:

electrical heating components within the top cover and electrical lines extending therefrom for coupling to a source of electrical potential during operation and use.

\* \* \* \* \*